Figure 1:
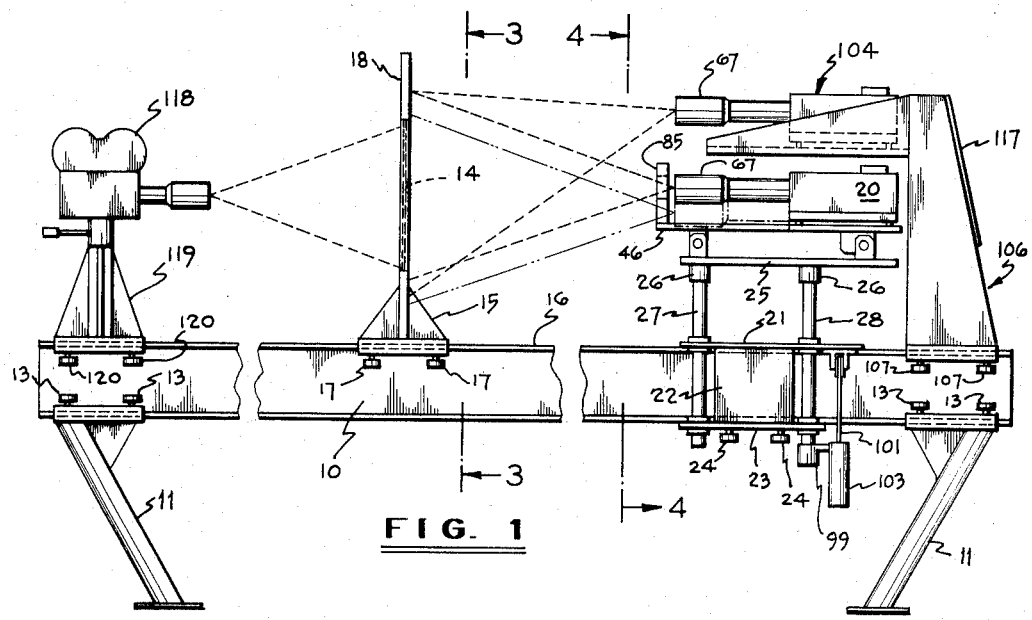

Nov. 30, 1965

H. W. VENDIG 3,220,792

APPARATUS FOR PRODUCING MOTION PICTURE FILM
FROM PROJECTED STILL IMAGES

Filed Nov. 30, 1960

4 Sheets-Sheet 1

*INVENTOR.*
Herbert W. Vendig
BY
Ernest H. Schmidt
Attorney

Nov. 30, 1965

H. W. VENDIG 3,220,792

APPARATUS FOR PRODUCING MOTION PICTURE FILM
FROM PROJECTED STILL IMAGES

Filed Nov. 30, 1960

4 Sheets-Sheet 2

INVENTOR.
Herbert W. Vendig
BY
Ernest H. Schmidt
Attorney

Nov. 30, 1965 H. W. VENDIG 3,220,792
APPARATUS FOR PRODUCING MOTION PICTURE FILM
FROM PROJECTED STILL IMAGES
Filed Nov. 30, 1960 4 Sheets-Sheet 3

INVENTOR.
Herbert W. Vendig
BY
Ernest H. Schmidt
Attorney

Nov. 30, 1965

H. W. VENDIG 3,220,792

APPARATUS FOR PRODUCING MOTION PICTURE FILM
FROM PROJECTED STILL IMAGES

Filed Nov. 30, 1960

4 Sheets-Sheet 4

INVENTOR.
Herbert W. Vendig
BY
Ernest H. Schmidt
Attorney

United States Patent Office 3,220,792
Patented Nov. 30, 1965

3,220,792
APPARATUS FOR PRODUCING MOTION PICTURE FILM FROM PROJECTED STILL IMAGES
Herbert W. Vendig, 7005 SW. 16th St., West Hollywood, Fla.
Filed Nov. 30, 1960, Ser. No. 72,756
6 Claims. (Cl. 352—89)

My invention relates to motion picture production and is directed particularly to a method and means for combining, in the studio, pre-prepared slides, art work, motion picture films, etc. together with sound track containing narration music, etc. in the production of an integrated motion picture film.

Heretofore conventional techniques for the most part have been employed in the production of moving picture films for such purposes as audio-visual sales, employee training films, educational films, TV films, amateur photography, etc. Thus, whereas manufacturers' presently mass-produce all of the various equipment used in film production and processing, no process has heretofore been devised to improve substantially upon the conventional film production techniques involving the time-consuming and expensive use of large camera crews in the field, and the subsequent conventional expensive and time-consuming editing and printing procedures.

It is accordingly the principal object of my invention to provide a method and means for sound film production on a mass production basis with a minimum of time consumption, operating personnel and expense.

A more particular object of my invention is to provide a method and means of the character described wherein pre-prepared slides, art work, and pre-filmed motion picture sequences can be combined in the studio with appropriate sound track in accordance with a pre-prepared scenario to produce an integrated moving picture film wherein the illusion of motion is created throughout the entire film.

Another object of my invention is to provide a method and means of film production of the character described wherein titles, printed matter or other indicia can easily be superposed on the film as may be required.

Still another object of my invention is to provide a film production process and apparatus of the character described wherein still elements such as art work and photographic slides, are so integrated on motion picture film in the studio as to create the illusion of movement simulating that of the same scenes reproduced directly by cinematography.

Figure 2:
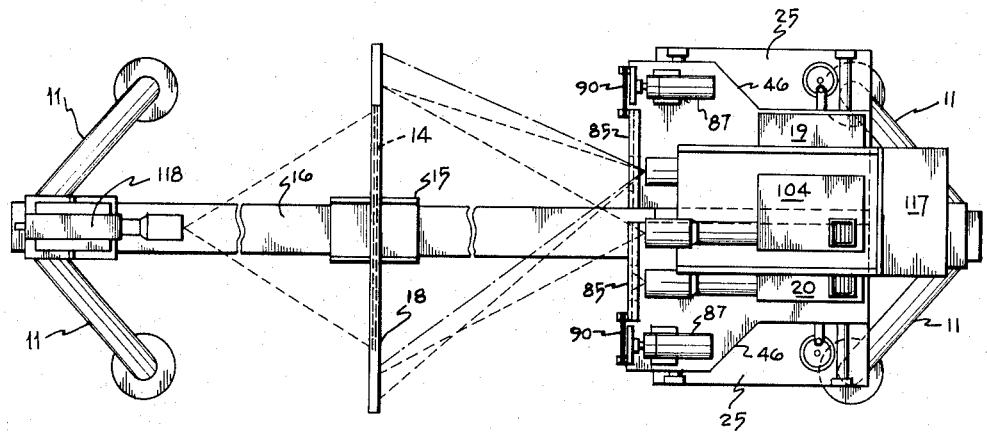
Figure 3:
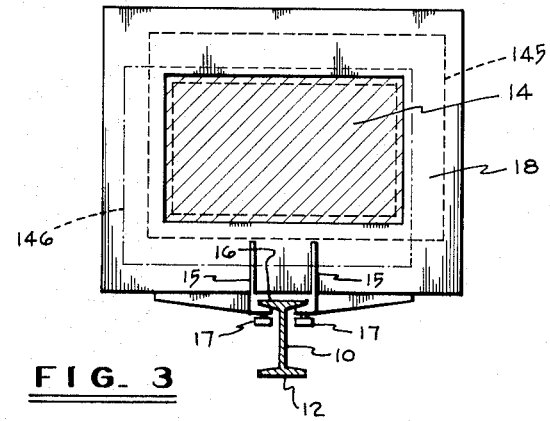
Figures 4, 4A:
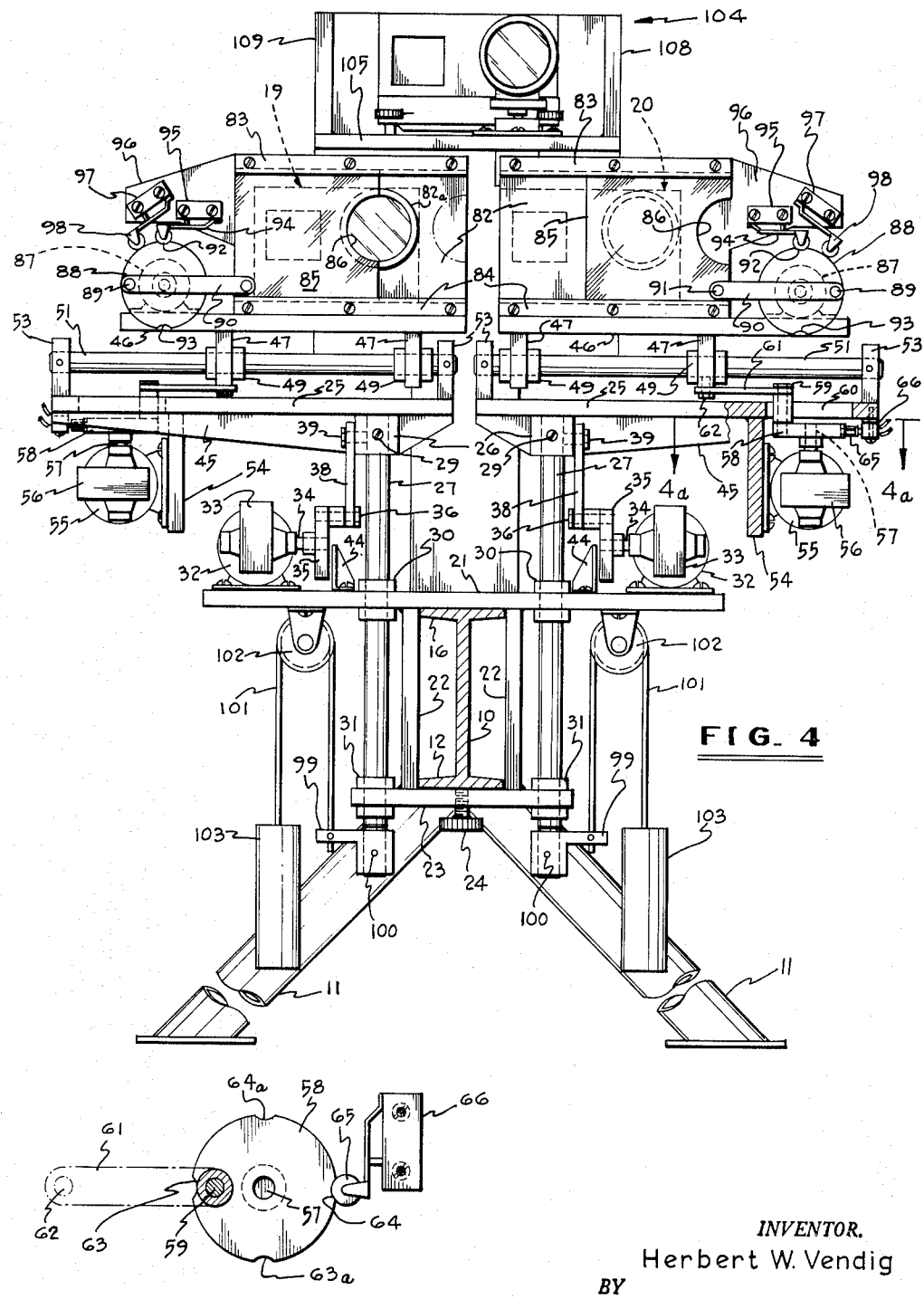
Figure 5:
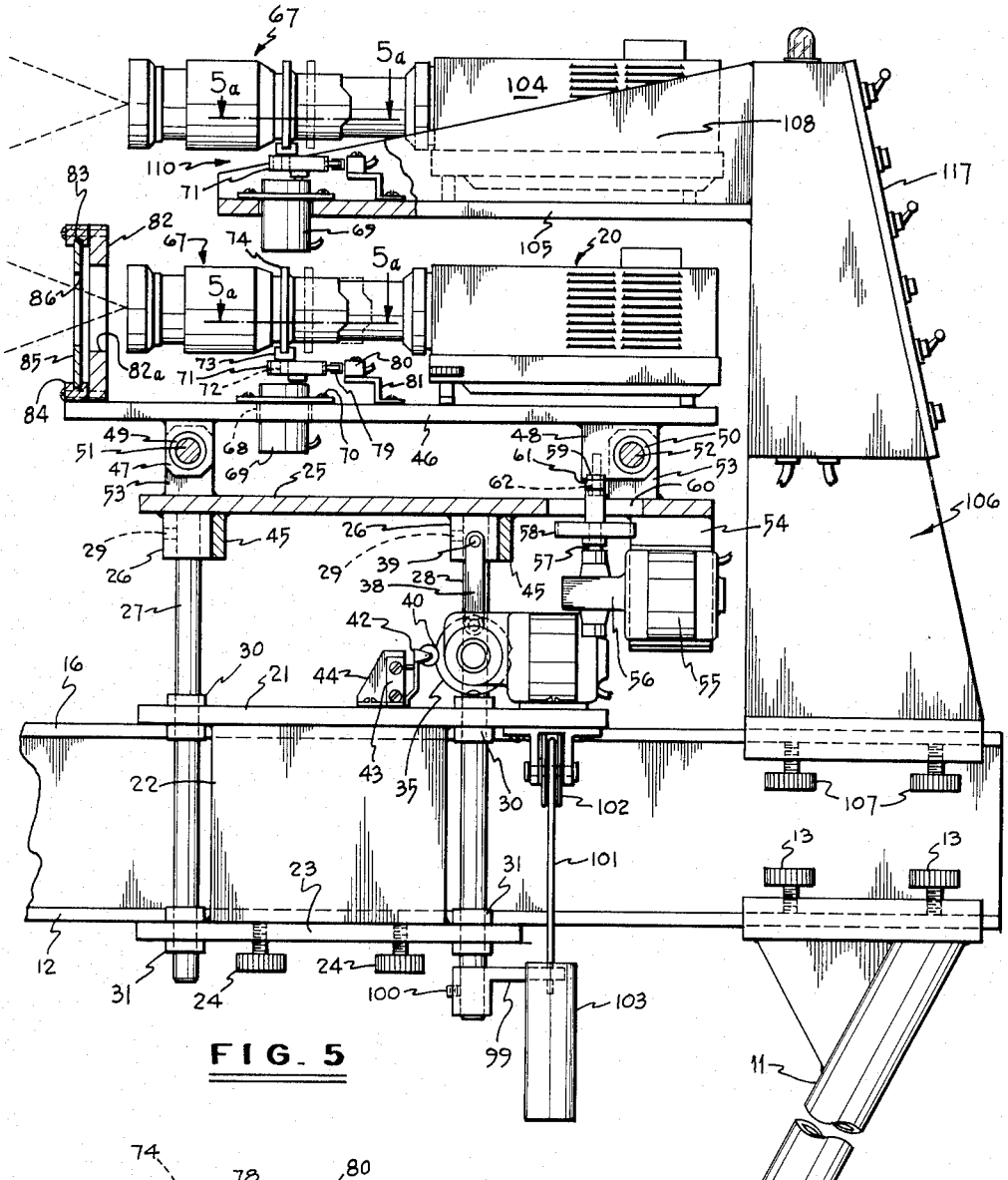
Figure 5A:
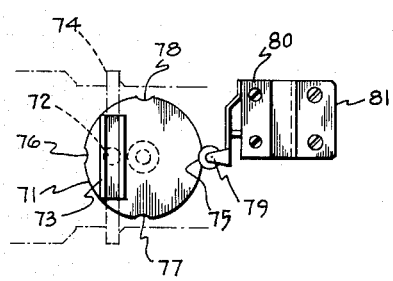
Figure 6:
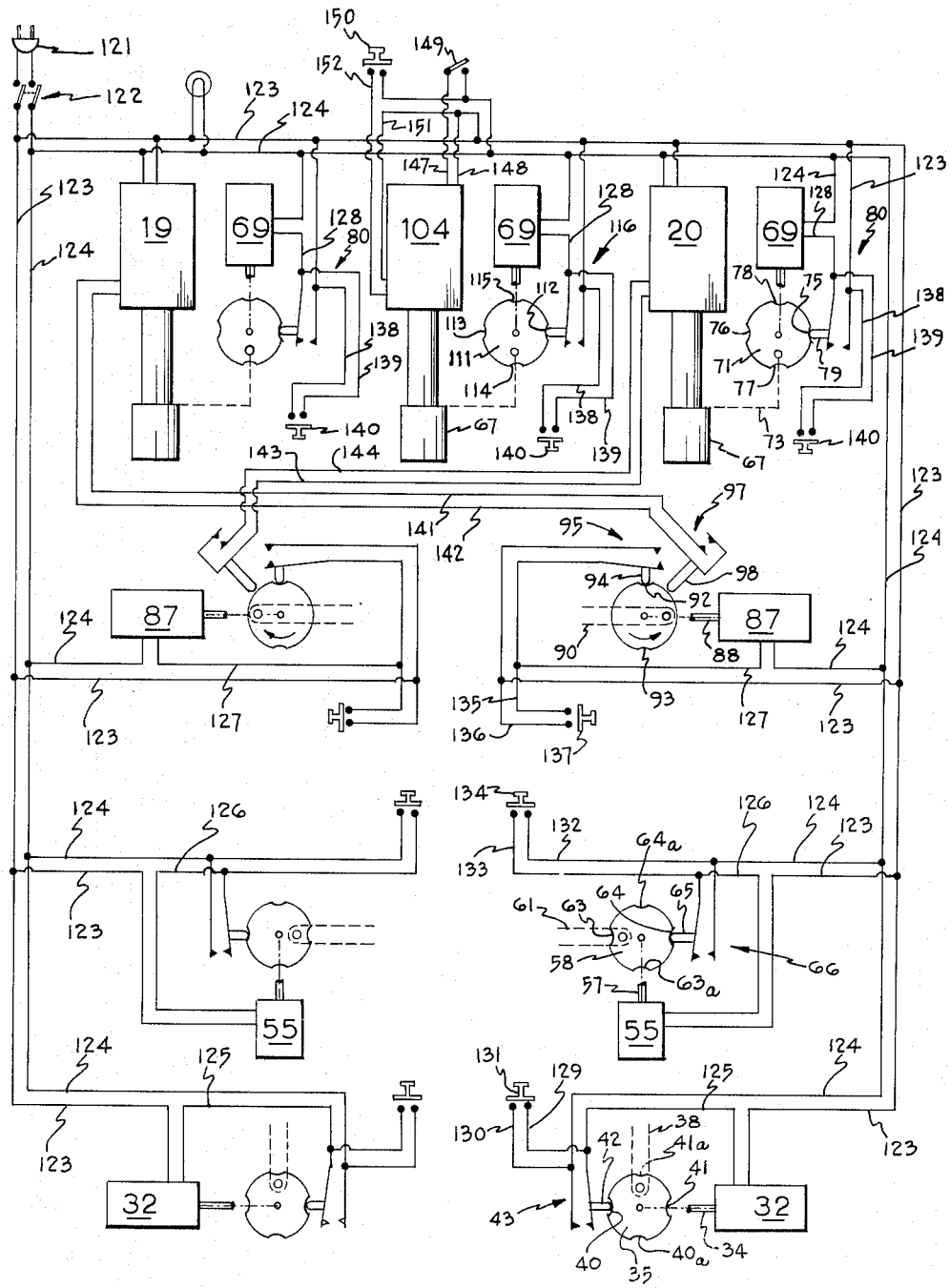

Other objects, features and advantages of my invention will be apparent from the following description when read with reference to the accompanying drawings. In the drawings, wherein like reference numerals denote corresponding parts throughout the several views:

FIG. 1 is a side elevational view of apparatus for the production of integrated moving pictures in accordance with the invention, FIG. 2 is a plan view thereof, FIG. 3 is a vertical cross-sectional view, taken along the line 3—3 of FIG. 1 in the direction of the arrows showing in front view the semi-transparent screen forming part of the invention, FIG. 4 is a front elevational view, with portions broken away, of the projector system embodying the invention, taken along the line 4—4 of FIG. 1 in the direction of the arrows, FIG. 4a is a partial vertical cross-sectional view taken along the line 4a—4a of FIG. 4 in the direction of the arrows, FIG. 5 is a side elevational view of FIG. 4, FIG. 5a is a partial horizontal view taken along the line 5a—5a of FIG. 5 in the direction of the arrows, and FIG. 6 is a schematic diagram in block form illustrating the electrical control system.

The invention, in brief, comprises the use of a semi-transparent screen upon which images from a plurality of projectors including at least two slide projectors are projected in a predetermined sequence on one side, and a motion picture camera adapted to simultaneously film the integrated projected picture, with appropriate sound, from the other side of the semi-transparent screen. Mechanism is provided for automatically "wiping" from one still projector to another, and for "zooming" and "panning" horizontally, vertically or obliquely a projector so as to give the illusion of motion, in the film produced, to the still images projected.

Referring now in detail to the drawings, 10 in FIGS. 1 through 5 designates an elongated support bar, which preferably is in the form of a steel I-beam, and which is supported at a horizontal position above the floor by stanchions 11 at each end secured to the lower flange 12 of said support bar as by lock screws 13. A transverse semi-transparent screen 14, of ground plate glass for example, extends vertically from the support bar 10 at a central position therealong, having a base member 15 embracing the upper flange 16 of said support bar. Lock screws 17 in the underside of the base member 15 enable securing the screen 14 at any adjusted position along the support bar 10. The marginal edge of the screen 14 is provided with an opaque rectangular mask 18 to prevent excess projected light being diffused into the motion picture camera, as is hereinbelow more fully explained.

Means is provided for independently supporting a pair of slide projectors 19, 20, side by side above the support bar 10 near one end thereof. To this end, a rectangular base plate 21 is seated upon the upper flange 16 of the support bar 10 and held in place against transverse or rotational movement with respect thereto by side plates 22 welded between the underside of said base plate and a rectangular bottom plate 23 disposed against the underside of the lower flange 12 of said support bar. A pair of lock screws 24 enable securing the base plate 21 at any adjusted position along the support bar 10.

Since the remainder of the support mechanism for each slide projector 19, 20 is the same, in mirror image, only that mechanism associated with projector 20, i.e., the right hand projector as seen in FIG. 4, will be described in detail herein.

Supported for vertical movement above the base plate 21 at one side thereof is a substantially rectangular vertical movement support plate 25. A pair of tubular sockets 26 welded against the underside of the support plate 25 carry the upper ends of a pair of cylindrical vertical slide bars 27, 28 secured in place as by set screws 29. The slide bars 27, 28 extend perpendicularly through two pairs of vertically aligned bushings 30, 31 preferably ball bushings, fitted in the base plate 21 and bottom plate 23, enabling vertical and parallel motion of the support plate 25 with respect to said base plate.

Mechanism is provided for automatically moving the support plate 25 vertically between upper and lower limit positions. To this end there is secured upon the base plate 21 a vertical drive electric motor 32 having a gear reduction mechanism 33 and slow speed output shaft 34. The output shaft 34 carries a crank wheel 35 having an eccentric crank pin 36 pivotally supporting one end of a crank link member 38. The other end of the crank link member 38 is pivotally connected to the outside of the rearmost tubular socket 26 as by a pivot bolt 39. It will be apparent that rotary movement of the crank wheel 35 through 180 degrees from the position illustrated, will move the support plate 25 from the upper limit position to the lower limit position. In order to effect automatic deenergization of the motor 32 at either limit position, the crank wheel 35 is provided with diametrically opposed cam recesses 40, 41 which co-operate with a roller arm 42 of a micro-switch 43 secured as by a bracket 44 to the base plate 21. The crank wheel 35 is also provided with opposed cam recesses 40a, 41a, 90 circular degrees removed from the cam recesses 40, 41 to effect motor deenergization at central points intermediate the upper and lower end positions. The micro-switch 43 is closed-circuited when the roller arm 42 thereof rides on the periphery of the crank wheel 35, and open circuits when received within one or another of the cam recesses 40, 40a, 41, 41a for purpose hereinbelow more fully described.

Preferably, the underside of the vertical movement support plate 25 is strengthened by a pair of laterally extending reinforcing ribs 45 welded thereagainst and against one each of the tubular sockets 26 (see FIGS. 4 and 5).

Supported for horizontal movement above the vertical movement support plate 25 is a horizontal movement support plate 46. The horizontal movement support plate 46 has welded to its underside a transversely aligned front pair of guide members 47 and a transversely aligned rear pair of guide members 48. The guide pairs 47, 48 carry ball bushing pairs 49, 50, respectively, guided on transverse, parallel, front and back cylindrical slide bars 51, 52 respectively, supported in spaced relation above the vertical movement support plate 25 as by end support members 53 fixed to and extending upwardly from said support plate.

Mechanism is provided for automatically moving the support plate 46 horizontally between inner and outer limit positions. To this end there is secured to a vertical bracket plate 54 welded against the underside of the vertical movement support plate 25, a horizontal drive electric motor 55 having a gear reduction mechanism 56 and a slow speed output shaft 57. The output shaft 57 carries a horizontal crank wheel 58 arranged in slightly spaced relation below the underside of the support plate 25. The crank wheel 58 carries an eccentric pin 59 extending through a circular opening 60 in the support plate 25, said pin being pivotally connected to one end of a crank link member 61. The other end of the crank link member 61 is pivotally connected to the underside of the innermost rear guide member 48 as by a pivot bolt 62 (see FIGS. 4, 4a). It will be apparent that rotary movement of the crank wheel 58 through 180 degrees from the position illustrated will move the horizontal movement support plate 46 from the inner limit position to the outer limit position. In order to effect automatic deenergization of the motor 55 at either limit position, the crank wheel 58 is provided with diametrically opposed cam recesses 63, 64 which cooperate with a roller arm 65 of a micro-switch 66 secured against the underside of the support plate 25. The crank wheel 58 is also provided with opposed cam recesses 63a, 64a, 90 circular degrees removed from the cam recesses 63, 64 to effect motor deenergization at central points intermediate the inner and outer limit positions. The micro-switch 66 is closed-circuited when the roller arm 65 rides on the periphery of the crank wheel 58, and open circuits when received within one or another of the limit position cam recesses 63, 64 and intermediate position cam recesses 63a, 64a, as is hereinbelow more fully explained.

The slide camera 20, which is of the well known type including mechanism for automatically sequentially changing slides prearranged in a slide magazine, and therefore not described herein in greater detail, is adjustably secured upon the horizontal movement support plate 46 and provided with a "zoom" lens 67. Mechanism is provided for electrically controlling the actuation of the "zoom" lens 67 for projecting smaller or larger images, as desired. To this end the horizontal movement support plate 46 is provided with an opening 68 through which an electric motor 69 projects, said motor being secured to said support plate as by machine screws 70 (see FIG. 5).

The motor 69 is provided with gear reduction mechanism having a slow speed output shaft carrying a crank wheel 71 (see FIG. 5a). The crank wheel 71 is provided with an eccentric pin 72 on which is journalled a yoke member 73 engaging the flange 74 of the actuating sleeve of the "zoom" lens 67, the arrangement being such that when the crank wheel 71 rotates through 180 degrees, said lens system will be moved from its outermost position, as in the full line representative thereof, to the broken line representation thereof in FIG. 5, whereupon the projected image will be increased from smallest to largest scale. In order to effect automatic deenergization of the motor 69 at either limit position or at an intermediate position between limits of movement of the "zoom" lens 67, the crank wheel 71 is provided with a first pair of diametrically opposed cam recesses 75, 76, determining limit positions, and a second pair of diametrically opposed cam recesses 77, 78, removed 90 circular degrees from said first pair of recesses, determining intermediate positions. The cam recesses 75, 76, 77 and 78 cooperate with a roller arm 79 of a micro-switch 80 secured with respect to the horizontal movement support plate 46 through a bracket 81. The micro-switch 80 is closed-circuited when the roller arm rides on the periphery of the crank wheel 71, and open circuits when received within any one of the cam recesses 75, 76, 77 and 78, as in hereinbelow more fully explained.

Sliding gate mechanism is provided for independently blocking image projection from the cameras 19, 20 for transfer of image projection from one camera to the other. To this end, there is secured upon the horizontal movement support plate 46 in front of the camera 20 (FIGS. 4, 5), an erect slide gate support plate 82 having a circular image opening 82a. Secured along the upper and lower ends of the slide gate support plate 82 against the front surface thereof are upper and lower grooved guide members 83, 84, horizontally slidably received between which is a flat gate 85. The gate 85 is provided with an arcuate recess 86 at one side which, when the gate is in "open" limit position (as illustrated for the gate associated with camera 19 in FIG. 4) circumscribes the camera projection lens, and which when the gate is in "closed" limit position, blocks off the image opening 82a in the slide gate support plate 82. Means is provided for simultaneously moving the gates 85 of each camera 19, 20 so that the projected image can be transferred in a "wipe" from one camera to another. To this end, as illustrated in FIG. 4, an electric motor 87 having a gear reduction output shaft is secured upon the horizontal movement support plate 46, said output shaft carrying a crank wheel 88. The crank wheel 88 is provided with a crank pin 89 to which is pivotally linked one end of a link member 90. The other end of the link member 90 is pivotally connected to a pin 91 extending outwardly from the front surface of the gate 85 near the lower, outermost corner thereof. In order to effect automatic deenergization of the motor 87 at either limit position, the crank wheel 88 is provided with a pair of diametrically opposed cam recesses 92, 93, which cooperate with a roller arm 94 of a micro-switch 95 secured against a lateral extension portion 96 of the slide support plate 82. The micro-switch 95 is closed-circuited when the roller arm 94 thereof rides on the periphery of the crank wheel 88, and open circuits when received within one or the other of the cam recesses 92, 93, as is hereinbelow more fully explained.

Means is also provided for automatically changing the image transparency or slide of one camera upon completion of image transfer to the other camera. To this end, a second micro-switch 97 is mounted on the extension portion 96 of the slide gate support plate 82, having a roller arm 98, slightly in advance of the roller arm 94 of the micro-switch 95. The micro-switch 97 is normally open-circuited and closes instantaneously to provide a current pulse to the opposite camera to sequentially change the image slide therein in accordance with a prearranged program at a time when projection from that camera is completely blocked off, as hereinbelow more fully described.

Mechanism is provided for counter-balancing the weight of the vertical movement support plate 25 and associated projector and support and control mechanism in its up and down movement as effected by the vertical drive motor 33. To this end, the lower end of the vertical slide bar 28 carries an outwardly-extending arm 99 sesured thereon as by a set screw 100 and supporting at its outer end one end of a counterweight cable 101. The cable 101 passes upwardly and around a pulley wheel 102 secured against the underside of the base plate 21, whence it extends downwardly with its other end joined to a cylindrical counterweight 103.

A third slide projector 104 is arranged at a fixed location above and between the movable projectors 19, 20, being supported by a horizontal support plate 105 extending outwardly of a vertical support structure 106 longitudinally adjustable with respect to the rearmost end of the support bar 10 and secured in adjusted position therealong as by lock screws 107. Side wall plates 108, 109 are welded between the horizontal support plate 105 and the vertical support structure 106 for strengthening purposes. The projector 104 also is provided with a "zoom" lens 67 and mechanism (indicated generally at 110 in FIG. 5) from remotely controlling the actuation of said "zoom" lens. The control mechanism 110 is identical with the "zoom" lens control mechanism described above in connection with movable slide projector 20, and comprises a crank wheel 111 having cam recesses 112, 113 and 114, 115 and a micro-switch 116 (see FIG. 6).

The back of the vertical support structure 106 is fitted with a control panel 117 upon which the various control switches of the control circuit hereinbelow described are mounted (see FIG. 5).

As illustrated in FIGS. 1 and 2 a motion picture camera 118 is supported at the opposite end of the support bar 10, being mounted on a vertical support member 119 adapted to be fixed in adjusted position along said support bar by lock screws 120. As illustrated in FIGS. 1 and 2, the camera 118 is focused upon the full field of the screen 14 to reproduce on a continuous film the images projected from the slide projectors 19, 20 and 104. By controlling the image transfer or "wipe" from one projector of the movable projectors 19, 20, to the other, and their independent horizontal and vertical movement with respect to the screen, as well as by controlling image size by means of "zoom" control, especially when these movements are judicially selected in accordance with the subject matter of the projected sequence of images, there is produced a startling simulation of continuous movement in the film being photographed at the front of the screen 14 by the camera 118.

The electrical system for the various controls of the projectors 19, 20 and 104 will now be described with reference particularly to the schematic diagram of FIG. 6. In FIG. 6, it will be seen that each of the drive motors 32, 55, 87 and 69 is energized from a common source through a service receptacle 121, an on-off swtich 122 and a pair of conductors 123, 124. The normally open micro-switch associated with each drive motor is connected in series with its motor energization circuit, to effect motor deenergization when the switch arm falls in a crank wheel recess. Thus, the micro-switches 43 associated with the vertical drive motors 32 are each connected in series therewith by a conductor 125; the micro-switches 66 associated with the horizontal drive motors 55 are each connected in series therewith by a conductor 126; the micro-switches 95 associated with the slide actuating motors 87 are each connected in series therewith by a conductor 127; and the micro-switches 80, 80 and 116 associated with "zoom" actuating motors 69 are each connected in series therewith by a conductor 128.

Manually actuated switch means is provided for individually energizing each of the drive motors 32, 55, 87 and 69 for independently controlling their respective functions. To this end, a push-button switch is connected in parallel with each of the micro-switches 43, 66, 95, 80 and 116. Thus, each micro-switch 43 associated with a vertical movement drive motor 32 has connected in parallel therewith by conductors 129, 130 a push button switch 131; each micro-switch 66 associated with a horizontal movement drive motor 55 has connected in parallel therewith by conductors 132, 133, a push button switch 134; each micro-switch 95 associated with a slide movement motor 87 has connected in parallel therewith by conductors 135, 136 a push button switch 137; and each micro-switch 80, 116 associated with a "zoom" actuating motor 69 has connected in parallel therewith by conductors 138, 139 a push button switch 140.

The normally open micro-switch 97 associated with the slide gate movement motor 87 for the movable slide projector 20 is connected as by conductors 141, 142, to the slide change mechanism energization circuit forming part of the movable projector 19; whereas the normally open micro-switch 97 associated with the slide gate movement motor 87 for the movable slide projector 19 is connected as by conductors 143, 144, to the slide change energization circuit forming part of the movable projector 20. In this manner, the cam mechanism for one movable projector serves to change to the next slide in a pre-arranged sequence in the other movable projector at an instant when the lens system of said other projector is blocked by its gate 85.

In operation, the projectors 19, 20, 104 are so spaced from the semi-transparent screen 14 that the field of their projected images will be substantially greater than the size of screen 14, so that the projected images will not leave the screen for any limit position of movement of the movable projectors 19, 20. Thus, as illustrated in FIG. 3, the field of a projected image represented at its uppermost and sidewardmost limit to one side by the broken line 145, and at its lowermost and sidewardmost limit to the other side by the dot-dash line 146, will not move off the screen 14 at either extreme position. Thus, as a projected image is moved from one image position to another with respect to the masked transparent fixed screen 14 at one side thereof, the image as seen at the other side of the screen and filmed by the motion picture camera 118 will subsequently be projected as motion in fixed field. By judicial selection of the order in which slides are projected, and the movement and "zoom" action given to each projected image as controlled by the operator in his actuation of the push button switches 131, 134, 137 and 140 located behind the projectors on control panel 117, a film is produced in the moving picture camera 118 which when screened will give the illusion of having been made at the filmed scenes or in the field in accordance with conventional motion picture filming techniques. The fixed projector 104, which is connected by conductors 147, 148 to the line source 123, 124 (see FIG. 6) through an on-off switch 149 and actuated for sequential image projection by a push-button switch 150 connected in series with a slide mechanism energizing circuit comprising conductors 151, 152, can be used for projecting titles or other printed mater on the screen along with the images from movable projectors 19, 20. Alternatively, or additionally, a motion picture projector could also be mounted on the horizontal support plate 105 for inserting filmed sequences in the production, particularly when moving people or animals are to be included in the film produced, which will further enhance the illusion of motion in the entire production as having been filmed by standard motion picture techniques in the field.

While in the apparatus herein disclosed the various still projector functions are controlled manually by push buttons during actual filming of the integrated production, it will be apparent that by the use of electronic control the intelligence for timing the sequencing of slides, art work, pre-filmed sequences, titles, etc., as well as the "panning" and "zooming" movements of the still cameras could be in the form of electrical impulses which could be fed into a programming control device in advance of actual filming to render the entire production of the film in the studio substantially automatic and complete.

While there is described and illustrated herein only one form in which the invention can conveniently be embodied in practice, it will be understood that this embodiment is presented by way of example and not in a limiting sense. In short, the invention is limited only by the scope and spirit of the following claims.

What I claim as new and for which I desire to secure Letters Patent is:

1. Apparatus for producing an integrated motion picture film from a plurality of projected still images which comprises, a semi-transparent screen, means for sequentially projecting a plurality of still images on one side of said screen, means for moving the projected images with respect to the screen during their intervals of projection, a motion picture camera operative to continually film the series of projected images as appearing on the other side of said semi-transparent screen, said sequentially projecting means comprising a pair of still image projectors and sliding gate mechanism operative to "wipe" from the projected image of one projector to the projected image of the other projector, a "zoom" lens system on each of said projectors, and means for controlling said "zoom" lens systems for selectively enlarging or decreasing in size projected images during their intervals of projection.

2. Apparatus as defined in claim 1 including a third image projector for superposing a fixed image on the movable images cast on said screen by said still image projectors.

3. In apparatus for producing an integrated motion picture film from a plurality of projected still images which comprises an elongated support member, a semi-transparent screen adjustably supported along a central portion of said support member, a pair of still image projectors, mechanism adjustably supporting said pair of still image projectors along one end portion of said support member, said screen extending transversely with respect to said support member and said image projectors being disposed to cast images on one side of said screen, mechanism for moving said adjustably supported image projectors during their intervals of projection, sliding gate mechanism operative to "wipe" from the projected image of one projector to the projected image of the other projector, a motion picture camera, and mechanism supporting said motion picture camera at the other end of said support member in position to continually film the series of projected images as appearing on the other side of said semi-transparent screen.

4. Apparatus as defined in claim 3 wherein said image projecting supporting mechanism comprises mechanism for selectively moving one or the other of said still image projectors vertically, horizontally or obliquely, selectively, with respect to said screen.

5. Apparatus as defined in claim 4 including a "zoom" lens system on each of said projectors, and means for controlling said "zoom" lens systems for selectively enlarging or decreasing in size projected images during their intervals of projection.

6. Apparatus as defined in claim 5 including a third image projector for superposing a fixed image on the movable images cast on said screen by said still image projectors.

References Cited by the Examiner

UNITED STATES PATENTS

| | | | |
|---|---|---|---|
| 1,341,527 | 5/1920 | Vyne | 352—133 |
| 1,718,782 | 6/1924 | Griem | 352—135 |
| 1,898,905 | 2/1939 | Seitz | 352—47 |
| 2,528,855 | 11/1950 | Caldwell et al. | 88—28 |
| 2,857,806 | 10/1958 | Shuftan | 352—89 |

NORTON ANSHER, *Primary Examiner.*

EMIL G. ANDERSON, G. Y. CUSTER, *Examiners.*